United States Patent
McArthur et al.

(10) Patent No.: US 8,926,188 B2
(45) Date of Patent: Jan. 6, 2015

(54) COMPLIANT BEARING MOUNT

(76) Inventors: Johnathon G. R. McArthur, Ottawa (CA); Matthew M. Wilkins, Ottawa (CA); Michael C. Lee, Oxford Station (CA)

( * ) Notice: Subject to any disclaimer, the term of this patent is extended or adjusted under 35 U.S.C. 154(b) by 92 days.

(21) Appl. No.: 13/513,504

(22) PCT Filed: Nov. 29, 2010

(86) PCT No.: PCT/CA2010/001889
§ 371 (c)(1), (2), (4) Date: Jun. 20, 2012

(87) PCT Pub. No.: WO2011/066641
PCT Pub. Date: Jun. 9, 2011

(65) Prior Publication Data
US 2012/0261536 A1 Oct. 18, 2012

(30) Foreign Application Priority Data
Dec. 2, 2009 (CA) .................................. 2686843

(51) Int. Cl.
*F16C 35/077* (2006.01)
*F16C 27/06* (2006.01)

(52) U.S. Cl.
CPC ............. *F16C 27/066* (2013.01); *F16C 35/077* (2013.01)
USPC ....................................................... 384/536

(58) Field of Classification Search
CPC ...... F16C 19/527; F16C 27/04; F16C 27/045; F16C 27/066
USPC .............................................. 384/99, 536, 582
See application file for complete search history.

(56) References Cited

U.S. PATENT DOCUMENTS

| | | | |
|---|---|---|---|
| 1,510,303 A * | 9/1924 | Bugatti | 384/535 |
| 2,414,335 A | 1/1947 | Schroeder | |
| 2,551,621 A * | 5/1951 | Michelsen | 384/536 |
| 3,365,032 A | 1/1968 | Gorndt | |
| 3,389,940 A | 6/1968 | Rumsey | |
| 5,205,384 A | 4/1993 | Heshmat | |
| 5,247,855 A | 9/1993 | Alten | |
| 5,969,446 A | 10/1999 | Eisenhaure | |
| 6,029,538 A | 2/2000 | Little | |
| 6,160,331 A | 12/2000 | Morreale | |
| 6,536,953 B1 | 3/2003 | Cope | |
| 6,630,761 B1 * | 10/2003 | Gabrys | 310/90.5 |
| 6,710,489 B1 | 3/2004 | Gabrys | |
| 6,747,378 B2 | 6/2004 | Brackett | |
| 6,786,642 B2 | 9/2004 | Dubreuil | |
| 6,959,756 B2 | 11/2005 | Woodard | |
| 7,546,782 B2 | 6/2009 | Adams | |
| 7,658,546 B2 | 2/2010 | Clarke et al. | |
| 2007/0262663 A1* | 11/2007 | Cheramy | 310/68 R |

* cited by examiner

*Primary Examiner* — Thomas R. Hannon (57) ABSTRACT

A compliant bearing mount for mounting a bearing relative to a support structure. The bearing mount assembly of the present invention is adapted to absorb a force applied to the bearing mount. A force translating element translates a component of an applied force to a shear force absorber, which absorbs the shear component of the applied force and restores the bearing mount back to the original position.

20 Claims, 6 Drawing Sheets

COMPLIANT BEARING MOUNT

This application is entitled to the benefit of, and incorporated by reference essential subject matter disclosed in PCT application No. PCT/CA2010/001889 filed on Nov. 29, 2010, which claims priority to Canadian Application No. 2,686,843 filed Dec. 2, 2009.

FIELD OF THE INVENTION

The present invention relates to compliant bearing mounts for high performance rotating machinery.

BACKGROUND OF THE INVENTION

High performance rotating machinery is employed in a variety of industrial applications, such as turbomachinery used for electrical power generation and aircraft propulsion, spacecraft attitude control devices, and flywheel energy storage devices.

Rotating machinery generally consists of a rotating element (for example, a shaft, turbine or flywheel) which is rotatably mounted on bearings within a stationary machine casing.

In applications where the machinery itself is mobile, mounting the rotating element poses specific challenges as off-axis moments and dynamic shocks to the rotating machinery can decrease operational efficiency and damage expensive components. This can result in significant economic losses and in a worst case scenario, catastrophic failure of the rotating machinery. Furthermore, high performance rotating machines experience significant axial and radial loads, which must be properly supported by the bearings.

To address such challenges, compliant bearings have been developed that permit a rotating machine to absorb dynamic shocks and vibrations. One well-known type of compliant bearing provides a spring loaded foil journal which supports a shaft, wherein a working fluid provides lubrication between the foil journal and the shaft when the machine is rotating at operational speed.

Another type of compliant bearing has been developed that uses strategically placed elastomers to absorb dynamic shocks. However, elastomers generally have high thermal resistance, and the elastomeric configurations available in the prior art do not allow heat to dissipate from the bearing, which can result in overheating and complete failure of the bearing.

Active magnetic suspension bearings have also been developed. However, active magnetic bearings typically require sophisticated software, actuators, position sensors and control hardware to ensure accurate and precise positioning of the rotating element within the machine casing.

Angular contact roller bearings have been developed which support both the radial and axial loads experienced by the rotating machine. However, these types of bearings can require additional shock absorbing mounts as they can be insufficient to absorb dynamic shock and vibration when installed on their own.

To ensure the longest possible operational lifespan in high performance applications, angular contact roller bearings must be mounted with high precision fits. Therefore, it is preferable to manufacture a mount for an angular contact roller bearing from hard materials capable of providing components with high tolerances for accuracy, cylindricity, flatness, runout, coaxiality and surface roughness.

Therefore, there is a need for a bearing mount specifically designed for high performance rotating machinery that: provides a high load capacity in both axial and radial directions; can absorb dynamic shocks to the machine casing; does not require sophisticated control equipment; has low thermal resistance allowing heat to dissipate; or, is constructed of materials which permit high tolerance fits.

SUMMARY OF THE INVENTION

In one aspect, the present invention provides a bearing mount assembly for mounting a bearing relative to a support structure, the bearing mount assembly including a bearing mount, the bearing mount including a force translating element, the bearing mount assembly further including a shear force absorber wherein when a force is applied to the bearing mount assembly so as to displace said bearing mount from a first position to a second position, said force translating element translates a shear component of said force to said shear force absorber, said shear force absorber absorbing said shear component of said force and acting to restore said bearing mount to said first position.

BRIEF DESCRIPTION OF THE DRAWINGS

Preferred embodiments of the present invention will now be described in greater detail and will be better understood when read in conjunction with the following drawings in which.

DETAILED DESCRIPTION OF THE EMBODIMENTS

The present invention provides a bearing mount which is adapted to mount a bearing relative to a support structure. The bearing can be any bearing suitable for the application including a roller bearing, ball bearing, angular contact bearing, needle bearing, and a thrust bearing among other bearings that will be readily apparent to the skilled person. The bearing can be a single, duplex or triplex (i.e.: multiple) bearing arrangement, and can be constructed of various materials, including but not limited to ceramic, steel and hybrid materials among other suitable materials that will be apparent to a person skilled in the art. In embodiments containing multiple bearings, these bearings may be arranged in any number of ways, including but not limited to face-to-face, back-to-back, among other arrangements. The bearing can be lubricated by means of grease, oil, oil mist, graphite, PTFE, $MoS_2$ or other solid lubricants, or combinations thereof, among other arrangements that will be understood by the skilled person. It is contemplated that the bearing may or may not include a bearing sleeve.

In at least one embodiment, the bearing rotatably supports a rotating element, which could be a shaft, turbine, flywheel, axle, gyroscope or any other piece of rotating machinery that will be readily apparent to the skilled person in the art. Typically, a rotating element will include two ends and will require at least one bearing at each of the ends, however it is also contemplated that the rotating element will only require support at one end.

The bearing mount and rotating element can be oriented in a horizontal, vertical or any other direction depending on the requirements of the application. It is contemplated that the bearing mount and rotating element can be operated in any environment, including but not limited to air, partial vacuum, complete vacuum, oil rich, among other environments.

The support structure can be any structure that is suitable for supporting the rotating element, such as but not limited to a bearing pedestal or machine casing.

A bearing mount in accordance with the present invention includes a force translating element that is designed to translate a component of a force that is applied to the rotating element or the bearing mount assembly. This force could take many forms and could be applied in any direction, including but not limited to an off-axis moment, a vibration or a dynamic shock.

The force translating element translates a shear component of a force in a direction that is determined by the shape of the force translating element, as will be discussed in greater detail below. When the rotating element or bearing mount assembly is subjected to a force, the bearing mount will be displaced relative to the support structure and the force translating element will translate a component of the force to a shear force absorber, which operates in shear to restore the bearing point to its first position. The force translating element could be received in a slot provided in the support structure or alternatively could be directly affixed to a surface, flange, or other structure provided on the support structure.

In at least one embodiment, the force translating element is a projecting flange, which can take various shapes depending on the needs of the application.

In at least one embodiment, the bearing mount can include a bore which is adapted to receive the bearing. The bearing can be permitted to float axially within the bore, or alternatively it can be axially fixed within the bore as will be described in further detail below. In alternative embodiments, the bearing is received on an axle or a receiving surface provided on the bearing mount.

In at least one embodiment the bore can extend through the entire axial width of the bearing mount, however in the alternative the bore can extend only partially through the bearing mount. It is contemplated that the bore can include an internal thread. The bore may also include a counterbore or shoulder against which the bearing is seated.

The shear force absorber is provided to absorb a shear component of a force translated by the force translating element and acts to restore the force translating element to its first, stationary position. The shear force absorber is adapted such that it is able to absorb the translated element of the force by operating in shear. Shear force absorber is designed to be thin, such that heat transfer through the shear force absorber can be accomplished at a high rate. Therefore, heat generated by the rotating element can be transferred from the bearing mount to the support structure where it can be dissipated to the surrounding environment.

As will be understood by the skilled person in the art, the present invention exploits anisotropic properties of the shear force absorber; that is, the dynamic properties (namely the spring stiffness coefficient, k, and damping coefficient, c) of the shear force absorber are determined and designed in one direction (i.e.: across a wide cross sectional area of the shear force absorber) while the thermal properties (namely thermal conductivity, $k_{th}$) are determined and designed in a substantially perpendicular direction (i.e. through a thin section of the shear force absorber).

In this way, the skilled person in the art can judiciously select a material (or combination of materials) for manufacturing the shear force absorber with any properties desirable for a particular application. The dynamic properties and the thermal properties of the shear force absorber can be determined and designed independently due to the anisotropic nature of the shear force absorber design.

The skilled person may also select a shear force absorber that is "tuned" or specially selected to provide desired characteristics or satisfy operating constraints when used with a particular rotating element. For example, the skilled person may wish to increase damping of the shear force absorber to exert stability over control fields or provide positive decay rates for natural frequencies. Alternatively, the skilled person may wish to strategically locate natural frequencies outside of standard operating speeds, and in this case may wish to vary the spring stiffness of the shear force absorber.

The shear force absorber may be manufactured from any material that provides the requisite damping, stiffness and heat transfer properties for the application. In at least one embodiment the shear force absorber is an elastomeric pad constructed of elastomeric material that has been selected to provide the desired stiffness, damping and thermal resistance that will be apparent to the skilled person in the art. Elastomeric material can be "doped" or impregnated with materials having a low thermal resistance that effectively improve the ability of shear force absorber to dissipate heat away from bearing mount to the surrounding environment. Materials suitable for doping the elastomeric material are available commercially and will be known to the skilled person in the art.

The shear force absorber typically will include two surfaces, one surface abutting the force translating element and the other surface abutting the support structure. Therefore, when force translating element is displaced relative to support structure, shear force absorber operates in shear to absorb the translated force and restore the force translating element to its initial position.

In this way, a bearing mount in accordance with the present invention can be manufactured of hard materials that allow highly toleranced fits, yet it can absorb forces applied to the rotating element or the bearing mount without severely disrupting the operation of the rotating element.

Furthermore, in at least one embodiment a bearing mount in accordance with the present invention does not experience significantly increased friction during startup conditions, and can be less prone to overheating.

Figure 1A:
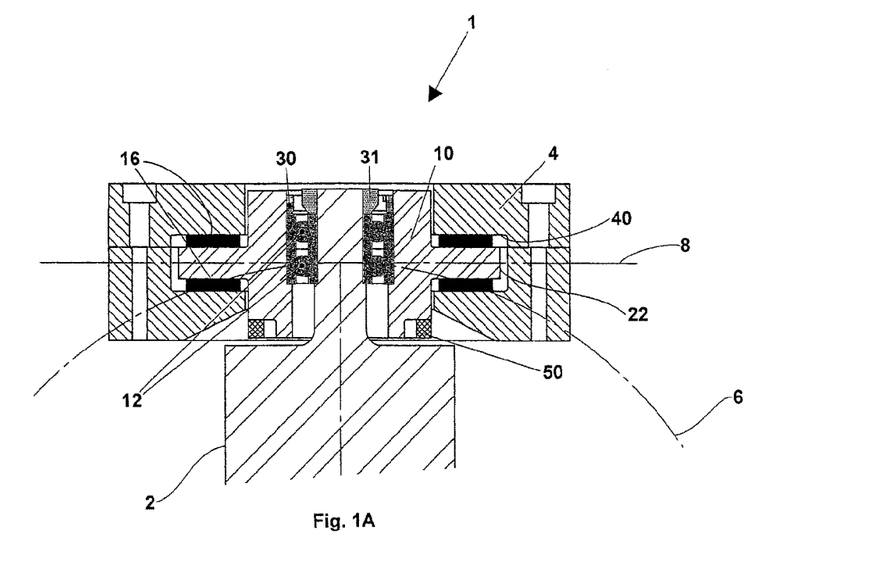
FIG. 1A is a cross-sectional view of one embodiment of the present invention.

Turning to FIG. 1A, at least one embodiment of the present invention is illustrated. Bearing mount assembly 1 includes a bearing mount 10, a projecting flange 22 and an elastomeric pad 16. Bearing mount 10 is adapted to mount a bearing 12 relative to the support structure 4. Bearing 12 rotatably supports a rotating element 2. Elastomeric pad 16 is adapted to absorb a shear component of a force applied to bearing mount assembly 1.

Figure 1B:
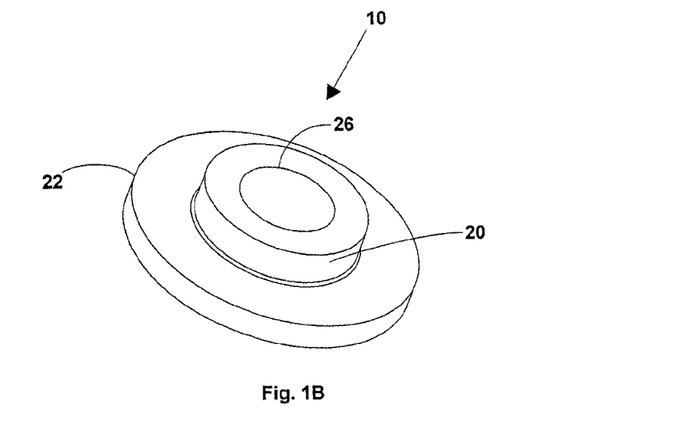
FIG. 1B is a perspective view of one embodiment of a bearing mount assembly in accordance with the present invention.

In at least one embodiment, bearing mount 10 can also include a central hub 20, as seen in FIG. 1B. Projecting flange 22 can be received in a receiving slot 40. Central hub can further include a bore 26 for receiving bearing 12. Bearing 12 can be axially fixed in bore 26 by way of an outer race bearing nut 30, or alternatively bearing 12 can be permitted to travel axially (i.e.: float) within bore 26. In at least one embodiment, bearing 12 can be axially fixed relative to rotating element 2 by way of inner race bearing nut 31.

As will be appreciated by the skilled person in the art, rotating element 2 will typically be supported at one end with an axially fixed bearing mount and supported at the other end with an axially floating bearing mount. However, other arrangements are contemplated, such as two axially fixed bearing mounts or alternatively two axially floating bearing mounts, among other arrangements.

In at least one embodiment, a magnetic thrust ring 50 may be optionally included to apply an opposing axial force on rotating element 2. In embodiments where magnetic thrust ring 50 is included, it can be located on a fixed bearing mount or on a stationary element of the bearing pedestal or machine casing, as will be understood by the skilled person. Magnetic thrust ring 50 is contemplated in a number of arrangements, including, but not limited to, a passive permanent magnetic device, or alternatively magnetic thrust ring 50 is an active device requiring a control system. In at least one embodiment, magnetic thrust ring 50 does not exert axial or radial position control on rotating element 2. In at least one embodiment, the magnetic field created by magnetic thrust ring 50 is space and time invariant.

As will be appreciated by the skilled person, when a rotating element suspended by two mounted bearings is subjected to a moment applied in a single axis, there is an ideal deflection path 6 that corresponds to a circle having a diameter prescribed by the distance between the two bearing mount centers.

In the case where the bearing mount is designed to absorb a moment in multiple axes, the ideal deflection path 6 corresponds to a sphere having a diameter prescribed by the distance between the two bearing mount centers.

With reference to FIGS. 1A and 1B, in at least one embodiment projecting flange 22 is provided which is suited for applications wherein it is desired that the bearing mount absorbs force in a radial direction relative to the rotating axis of the machine. As will be recognized by the skilled person in the art, in this instance there is a slight divergence from the ideal deflection path 6 and the actual deflection path 8 when the rotating machine is subjected to an off-axis moment which results in bearing angular misalignment.

As discussed above, the force translating element may take a number of shapes depending on the needs of the present application. In embodiments that include projecting flange 22, projecting flange 22 may take a number of shapes that will govern the direction in which the bearing mount 10 is displaced relative to support structure 4 when a force or moment is applied to bearing mount assembly 1 or rotating element 2.

As will be appreciated by the skilled person in the art, projecting flange 22 could take an spherical, arcuate, conical or angular shape as seen in FIGS. 2B, 2C, 3B and 3C.

Figure 2A:
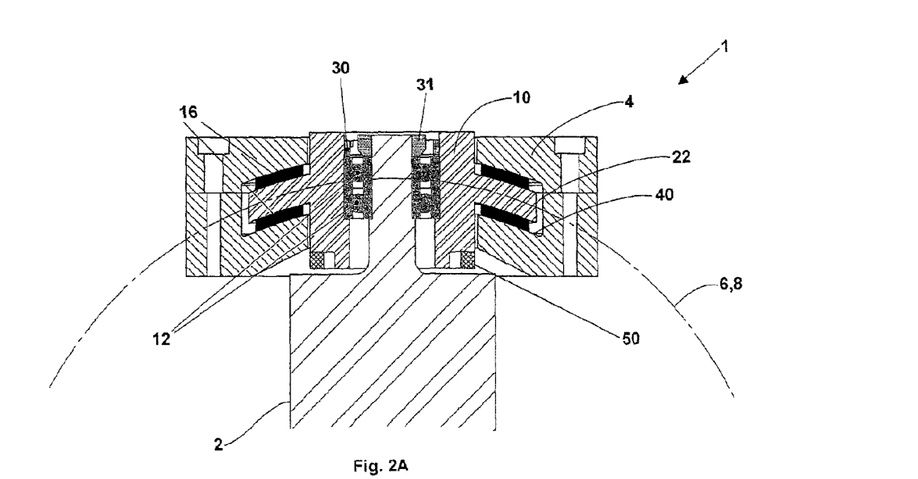
FIG. 2A is a cross-sectional view of one embodiment of a bearing mount assembly in accordance with the present invention comprising a spherical mounting arrangement.
Figure 2B:
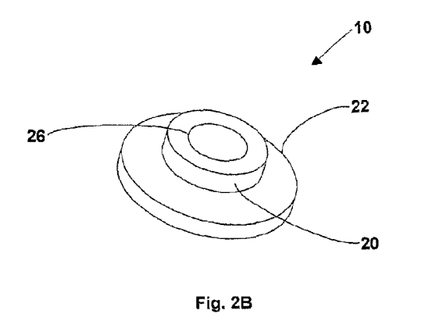
FIG. 2B is a perspective view of one embodiment of a bearing mount assembly comprising a spherical force translating element in accordance with the present invention.
Figure 2C:
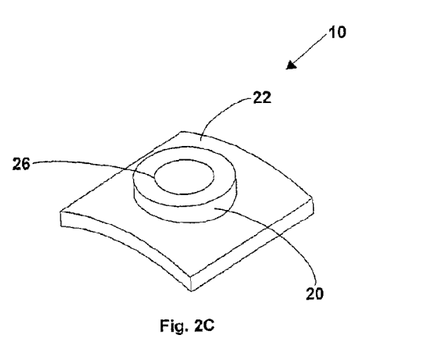
FIG. 2C is a perspective view of one embodiment of a bearing mount assembly comprising an arcuate force translating element in accordance with the present invention.

With reference to FIG. 2A, a spherical arrangement will provide an actual deflection path 8 that is identical to the ideal deflection path 6 for applied moments, which is well suited to applications where the rotating machinery is most expected to see off-axis moments. The spherical arrangement can be adapted to move relative to support structure 4 in multiple axes as seen in FIG. 2B or alternatively could be adapted to move relative to support structure 4 in a single axis as seen in FIG. 2C, as will be understood by the skilled person in the art.

Figure 3A:
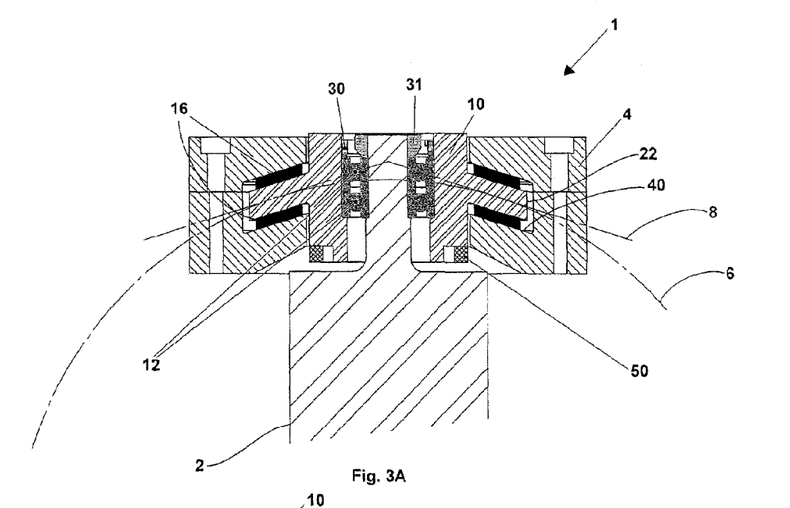
FIG. 3A is a cross-sectional view of one embodiment of a bearing mount assembly in accordance with the present invention in a conical mounting arrangement.
Figure 3B:
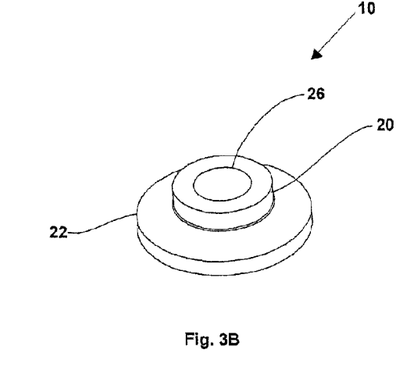
FIG. 3B is a perspective view of one embodiment of a bearing mount assembly comprising a conical force translating element in accordance with the present invention.
Figure 3C:
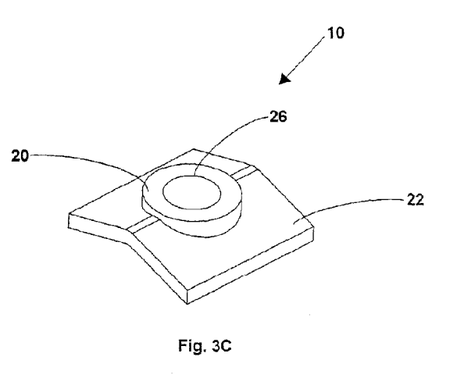
FIG. 3C is a perspective view of one embodiment of a bearing mount assembly comprising an angular force translating element in accordance with the present invention.

With reference to FIG. 3A, a conical arrangement will provide an actual deflection path 8 that deviates very little from the ideal spherical deflection path 6. The conical arrangement can be adapted to move relative to support structure 4 in multiple axes as seen in FIG. 3B or alternatively could be adapted to move relative to support structure 4 in a single axis as seen in FIG. 3C, as will be understood by the skilled person in the art. This arrangement provides a bearing mount that provides close approximation of the ideal spherical path at small angular displacements yet can be manufactured in a manner that is more economical than the spherical arrangement.

Turning back to FIG. 1A, elastomeric pad 16 is located between projecting flange 22 and the support structure 4. In at least one embodiment, support structure 4 can further include a receiving slot 40 which receives projecting flange 22, however elastomeric pad 16 could directly fix the force translating element to an outer surface, flange or other structure provided on support structure 4, among other arrangements that will be readily appreciated by a skilled person in the art.

In at least one embodiment, two elastomeric pads are employed, one on the distal surface of projecting flange 22 relative to rotating element 2 and one on the proximal surface of projecting flange 22 relative to rotating element 2, as seen in FIG. 1A. However, it is contemplated that only one elastomeric pad may located between the force translating element and the support structure 4, or alternatively more than two elastomeric pads could be used.

Figure 4A:
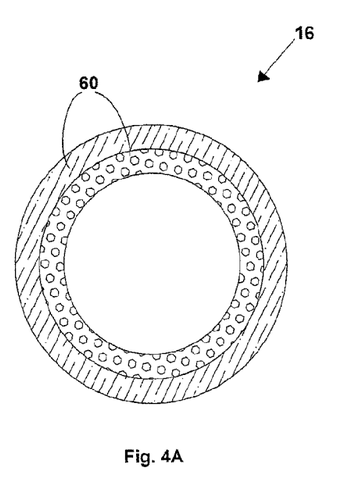
FIGS. 4A, 4B and 4C are plan views of various embodiments of shock absorbing assemblies for use in connection with the present invention.
Figure 4B:
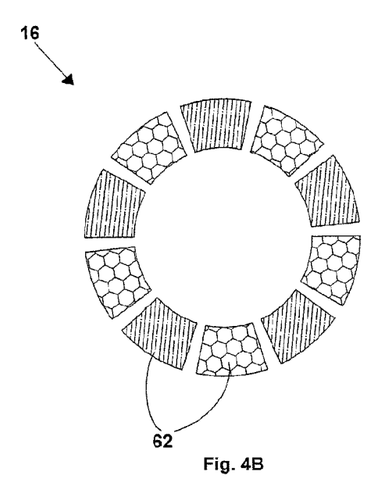
Figure 4C:
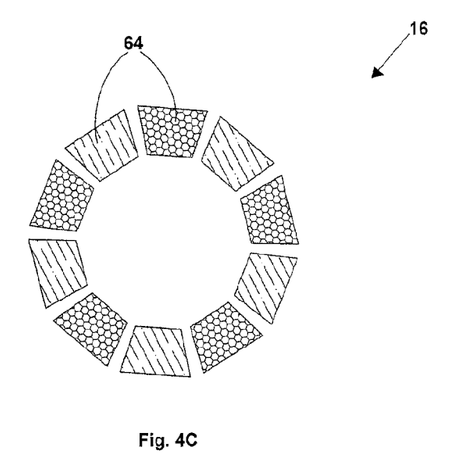

As can be seen in FIG. 4A, in at least one embodiment elastomeric pad 16 can be a series of concentric elastomeric rings 60. Each concentric elastomeric ring 60 could be a different elastomeric material providing different properties for heat transfer, stiffness and damping, or alternatively each concentric elastomeric ring 60 could be manufactured from the same material. In other arrangements, elastomeric pad 16 can be a series of separate arc segments 62 (as shown in FIG. 4B) or trapezoidal segments 64 (as shown in FIG. 4C). In these latter examples, the segments 62/64 can all be the same material or in an alternative arrangement the segments can be two or more different materials chosen for specific heat transfer, stiffness and damping properties.

In alternative embodiments, elastomeric pad 16 can take any shape that suits the needs of the present application, including but not limited to rectangles, solid circles, square shapes, among other shapes provided that elastomeric pad 16 can absorb a shear component of an applied force and act to restore bearing mount 10 to its first, stationary position.

In at least one embodiment, receiving slot 40 will have substantially the same shape as projecting flange 22. Therefore, when a force is applied to bearing mount assembly 1 or rotating element 2, the bearing mount 10 will be displaced within receiving slot 40 relative to support structure 4 in a path that is determined by the shape of projecting flange 22.

As bearing mount 10 is displaced from a first, stationary position to a second position, elastomeric pad 16 will operate in shear to absorb the translated component of the applied force, and restore bearing mount 10 back to the first, stationary position.

Figure 5:
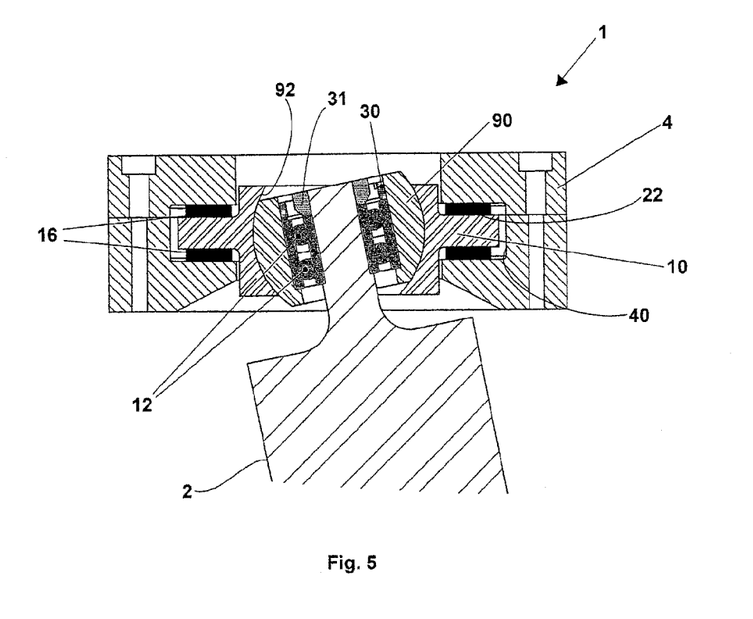
FIG. 5 is a cross-sectional view of one embodiment of the present invention for use in situations where two bearing mounts are misaligned.

With reference to FIG. 5, in at least one embodiment, bearing mount 10 includes a spherical central hub 90 that is pivotably received in a spherical socket 92. As will be appreciated by the skilled person, this arrangement permits alignment of two misaligned bearing mounts while still providing the benefits of the present invention.

Figure 6:
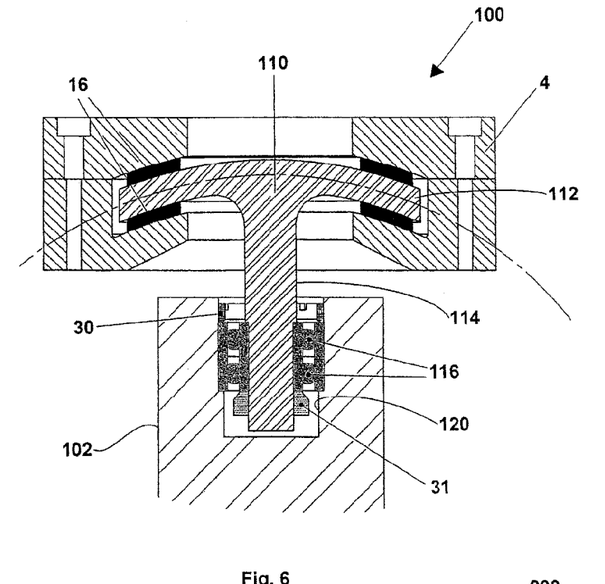
FIG. 6 is a cross-sectional view of one embodiment of the present invention in a spherical mounting arrangement utilizing a rotating outer race in a first configuration.

With reference to FIG. 6, in at least one embodiment an outer race rotation bearing mount assembly 100 is contemplated for rotatably supporting a rotating element 102. In this arrangement force translating element is a projecting flange 112. Bearing mount 110 can further include a central axle 114 which is adapted to mount a bearing 116. Bearing 116 is received in a bore 120 provided in rotating element 102.

Figure 7:
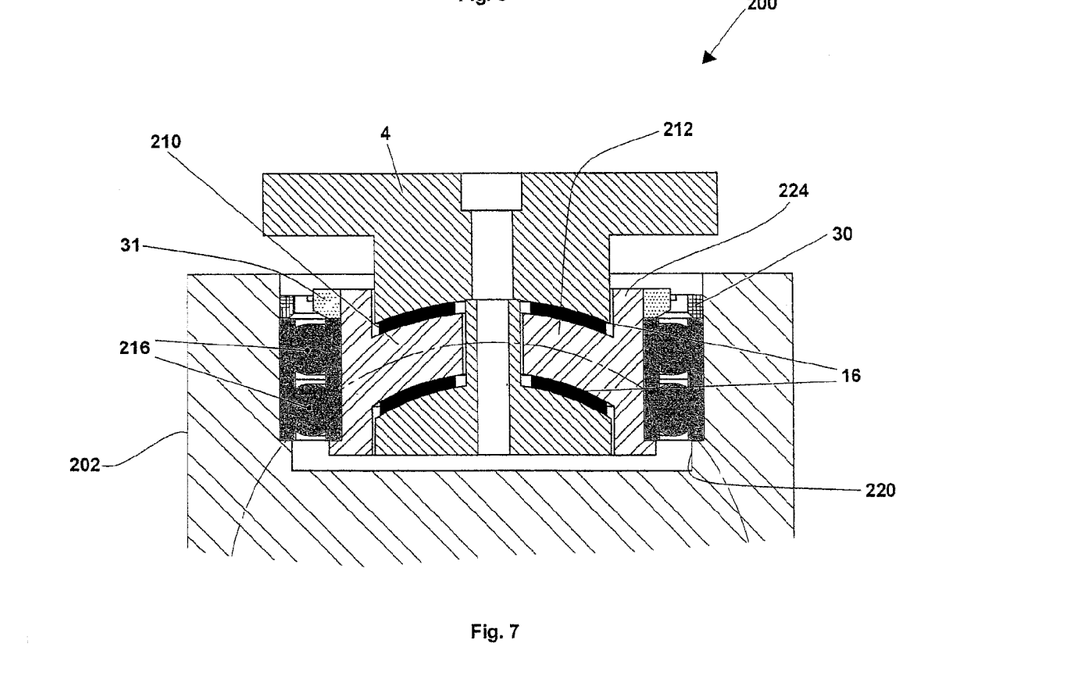
FIG. 7 is a cross-sectional view of one embodiment of the present invention in a spherical mounting arrangement utilizing a rotating outer race in a second configuration.

With reference to FIG. 7, in at least one embodiment a large bore outer race rotation bearing mount assembly 200 is contemplated for rotatably supporting a rotating element 202. In this arrangement force translating element is an internally projecting flange 212. Bearing mount 210 can further include an annular flange 224 which is adapted to mount a large bore bearing 216. Large bore bearing 216 is received in a bore 220 provided in rotating element 202.

In at least one embodiment, the present invention provides a bearing mount assembly for mounting a bearing relative to a support structure, the bearing mount assembly including: a bearing mount, the bearing mount having a force translating element, the force translating element being a projecting flange; and, a shear force absorber, the shear force absorber manufactured from elastomeric material wherein when a force is applied to the bearing mount assembly so as to displace said bearing mount from a first position to a second position, said force translating element translates a shear component of said force to said shear force absorber, said shear force absorber absorbing said shear component of said force and acting to restore said bearing mount to said first position.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

We claim:

1. A bearing mount assembly for mounting a rolling element bearing relative to a support structure, the bearing rotatably supporting a rotating element, the rotating element defining a rotating axis, the bearing mount assembly comprising:
   a bearing mount, said bearing mount comprising:
      at least one force translating element comprising at least one lateral surface, and
      at least one shear force absorber adapted to make contact with said at least one lateral surface;
   wherein when an off axis moment is applied to the bearing mount assembly so as to displace said bearing mount from a first position to a second position in a direction aligned with said at least one lateral surface, said at least one force translating element translates a shear component of said off axis moment to said at least one shear force absorber, said at least one shear force absorber absorbing said shear component of said off axis moment and acting to restore said bearing mount to said first position, wherein said force translating element comprises a projecting flange, said at least one shear force absorber being mounted between said projecting flange and the support structure and wherein said projecting flange is a spherical projecting flange or a conical projecting flange.

2. The bearing mount assembly of claim 1 wherein said spherical projecting flange is adapted to absorb said off axis moment in a single direction.

3. The bearing mount assembly of claim 1 wherein said spherical projecting flange is adapted to absorb said off axis moment in multiple directions.

4. The bearing mount assembly of claim 1 wherein said conical projecting flange is adapted to absorb said off axis moment in a single direction.

5. The bearing mount assembly of claim 1 wherein said conical projecting flange is adapted to absorb said off axis moment in multiple directions.

6. The bearing mount assembly of claim 1 wherein said at least one shear force absorber is comprised of a series of concentric rings.

7. The bearing mount assembly of claim 1 wherein said at least one shear force absorber is comprised of a series of arc elements.

8. The bearing mount assembly of claim 1 wherein said at least one shear force absorber is comprised of a series of trapezoidal elements.

9. The bearing mount assembly of claim 1 wherein said at least one shear force absorber is manufactured from elastomeric material.

10. The bearing mount assembly of claim 1 further comprising a magnetic thrust ring, said magnetic thrust ring applying a biasing force to the rotating element, said biasing force acting in opposition to a displacement force acting to axially displace the rotating element relative to said bearing mount.

11. The bearing mount assembly of claim 1 wherein the at least one lateral surface extends into a receiving slot in the support structure.

12. The bearing mount assembly of claim 11 wherein the at least one lateral surface and the receiving slot are substantially orthogonal to the axis of rotation.

13. The bearing mount assembly of claim 11 wherein the at least one lateral surface and the receiving slot are angled relative to the axis of rotation.

14. The bearing mount assembly of claim 1 wherein the at least one lateral surface comprises a proximal surface and a distal surface relative to the rotating element, and wherein the at least one shear force absorber comprises two elastomeric pads for engaging each of the proximal and distal surfaces.

15. A bearing mount assembly for mounting a rolling element bearing that rotatably supports a rotating element for rotation relative to a support structure about an axis of rotation, the bearing mount assembly comprising:
   at least one force translating element having a first surface for engaging the bearing, the first surface being parallel to the axis of rotation, wherein the force translating element is displaceable between a first position and a second position relative to the support structure along a deflection path in response to an off axis moment; and
   at least one elastomeric shear force absorber aligned substantially with the deflection path to absorb a shear force when the force translating element is displaced from the first position toward the second position, wherein the force translating element is a spherical projecting flange.

16. The bearing mount assembly as claimed in claim 15 wherein the support structure comprises a receiving slot for receiving a lateral surface of the force translating element.

17. The bearing mount assembly as claimed in claim 15 wherein the at least one elastomeric shear force absorber is a thin anisotropic pad having stiffness and damping coefficients in a direction parallel to the deflection path that optimize shear force absorption and having thermal properties in an orthogonal direction across the thin anisotropic pad to optimize heat transfer.

18. A bearing mount assembly for mounting a rolling element bearing that rotatably supports a rotating element for rotation relative to a support structure about an axis of rotation, the bearing mount assembly comprising:
   at least one force translating element having a first surface for engaging the bearing, the first surface being parallel to the axis of rotation, wherein the force translating element is displaceable between a first position and a second position relative to the support structure along a deflection path in response to an off axis moment; and
   at least one elastomeric shear force absorber aligned substantially with the deflection path to absorb a shear force when the force translating element is displaced from the first position toward the second position, wherein the force translating element is a conical projecting flange.

19. The bearing mount assembly as claimed in claim 18 wherein the support structure comprises a receiving slot for receiving a lateral surface of the force translating element.

20. The bearing mount assembly as claimed in claim 18 wherein the at least one elastomeric shear force absorber is a thin anisotropic pad having stiffness and damping coefficients in a direction parallel to the deflection path that optimize shear force absorption and having thermal properties in an orthogonal direction across the thin anisotropic pad to optimize heat transfer.

* * * * *